United States Patent [19]

Ostrovsky

[11] Patent Number: 5,970,421
[45] Date of Patent: Oct. 19, 1999

[54] METHOD FOR DETERMINING SPATIAL COHERENCES AMONG FEATURES OF AN OBJECT

[75] Inventor: Emil Y. Ostrovsky, Moscow, Russian Federation

[73] Assignee: Target Strike, Inc., San Antonio, Tex.

[21] Appl. No.: 08/972,989

[22] Filed: Nov. 19, 1997

[51] Int. Cl.[6] .............................. G01V 1/00; G01V 3/00; G01V 5/00; G06F 17/00
[52] U.S. Cl. .................................................................. 702/1
[58] Field of Search ................... 702/1, 5, 16, 2

[56] References Cited

U.S. PATENT DOCUMENTS

5,606,499  2/1997  Ostrovsky ................................. 702/1

Primary Examiner—Donald E. McElheny, Jr.
Attorney, Agent, or Firm—Christopher L. Makay

[57] ABSTRACT

A processing system implements a method for establishing spatial coherences among features of an object. The processing system begins by measuring at least one physical property of the object at a plurality of different locations to construct at least one data field. Second, the processing system digitizes the data within the data field. Third, the processing system arranges the data within the data field into a matrix. Fourth, the processing system creates a target dichotomy matrix from the matrix. Fifth, the processing system transforms the data within the matrix to develop transformation matrices. Sixth, the processing system develops base dichotomy matrices from the transformation matrices. Seventh, the processing system creates a full description set of matrices utilizing the base dichotomy matrices. Eighth, the processing system creates a matrix that establishes spatial coherences among features of the object utilizing the full description set of matrices. Finally, the processing system displays the matrix that establishes spatial coherences among features of the object.

31 Claims, 5 Drawing Sheets

DEGREE OF
SIMILARITY
NUMBER

$M_1$ AND $M_1$ = 1.0
$M_1$ AND $M_2$ = 0.7
$M_1$ AND $M_3$ = 0.9
$M_2$ AND $M_2$ = 1.0
$M_2$ AND $M_3$ = 0.8
$M_3$ AND $M_3$ = 1.0

|       | $M_1$ | $M_2$ | $M_3$ |
|-------|-------|-------|-------|
| $M_1$ | 1.0   | 0.7   | 0.8   |
| $M_2$ | 0.7   | 1.0   | 0.8   |
| $M_3$ | 0.9   | 0.8   | 1.0   |

METHOD FOR DETERMINING SPATIAL COHERENCES AMONG FEATURES OF AN OBJECT

BACKGROUND OF THE INVENTION

1. Field of the Invention

The present invention relates to a method for determining spatial coherences among features of an object.

2. Description of the Related Art

Many current methods of object exploration involve the analysis of data fields for observed properties of the object such as the strength of physical fields (e.g., magnetic, radioactive, gravitational, infrared, and electromagnetic) to deduce the location and range of features within the object. There are two principal approaches for analyzing data fields to detect features within an object. The first approach is pattern recognition which involves comparing a data field of an object to other data fields of objects known to possess a desired feature. Patterns common to the data fields indicate the presence of the desired feature in the object under investigation. The second approach is an "expert system" which classifies data according to a complex scheme that employs many variables and uses decision-making rules subjectively selected by an investigator based on his experience, knowledge, and intuition.

Although pattern recognition methods and "expert system" technology are often adequate to locate features within an object, there are disadvantages to those techniques. They frequently produce biased outcomes because pattern recognition is heavily influenced by past occurrences of features and "expert systems" are dependent upon the feature selection criteria chosen by the investigator. When a biased outcome occurs, more meaningful features within an object may have been suppressed in favor of less meaningful ones that happen to correlate with a previously observed feature or a feature predicted to be meaningful by the investigator. Furthermore, the aforementioned techniques are directive because judgments of correlation between features in the object are made based upon pre-existing features. Thus, at each opportunity for deciding whether sufficient correlation exists, incremental preferences for the pre-existing feature are introduced. Accordingly, neither technique permits natural meaningful features within an object to be detected without the influence of a pre-existing feature selected beforehand by the investigator.

U.S. Pat. No. 5,606,499, which was issued to Ostrovsky on Feb. 25, 1997, discloses a method and apparatus that improves over pattern recognition and "expert systems" by eliminating preferences toward pre-existing features. Preferences are eliminated because features within an object are located without comparing the object to a pre-existing feature or using a feature generated by an investigator. Instead, data fields of an object are examined to determine structural organization within the data fields themselves, which typically indicates features that are significant.

In addition, the object may be compared to a target to determine if it exhibits qualities of the target. This identifies structures within the object similar to the target, however, it fails to furnish an indication of coherences among the structures within the object. Coherence information is important because it provides a pointer to the actual location of the structures within the object creating a feature similar to the target. Accordingly, a method and apparatus that produce coherence information for structures within an object will enhance the likelihood of locating features within an object.

SUMMARY OF THE INVENTION

In accordance with the present invention, a processing system implements a method for establishing spatial coherences among features of an object. The processing system begins by measuring at least one physical property of the object at a plurality of different locations to construct at least one data field. Second, the processing system digitizes the data within the data field. Third, the processing system arranges the data within the data field into a matrix. Fourth, the processing system creates a target dichotomy matrix from the matrix. Fifth, the processing system transforms the data within the matrix to develop transformation matrices. Sixth, the processing system develops base dichotomy matrices from the transformation matrices. Seventh, the processing system creates a full description set of matrices utilizing the base dichotomy matrices. Eighth, the processing system creates a matrix that establishes spatial coherences among features of the object utilizing the full description set of matrices. Finally, the processing system displays the matrix that establishes spatial coherences among features of the object.

DETAILED DESCRIPTION OF THE PREFERRED EMBODIMENT

Figure 1:
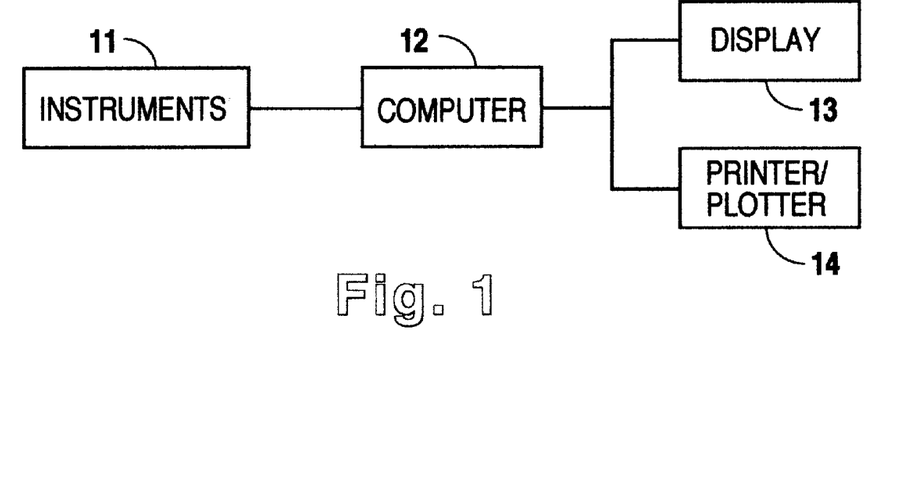
FIG. 1 is a block diagram illustrating a processing system implementing the preferred embodiment of the present invention.

FIG. 1 illustrates processing system 10 that inputs and processes data of a physical property or set of physical properties of an object to determine spatial coherences within the object most likely to host the development of highly organized zones within the object. Spatial coherences are the most stable organized states of the observed data field which are the best cumulative representations of the entire organizational diversity within the object. Processing system 10 receives input from instruments 11 which measure any physical property or combination of physical properties found in an object and provide a digitized data representation of the measured physical property or properties. Alternatively, if instruments 11 produce only analog output, an analog-to-digital converter may be employed to produce the necessary digitized data representation of the physical property or properties.

Example physical properties include but are not limited to magnetic field, gravitational field, radioactive field, and seismic field. Instruments 11 are any suitable devices capable of measuring physical parameters such as magnetometers and gamma-spectrometers. Although FIG. 1 illustrates a connection between instruments 11 and processing system 10, those skilled in the art will recognize that instruments 11 may be remote from processing system 10 and that any data from a measured physical property or set of physical properties may be stored in a storage device such as magnetic media or laser disk for later input into processing system 10.

Processing system 10 determines the spatial coherences in the data fields of the physical property or set of physical properties because spatial coherences correspond to zones within the object that exhibit structural similarity to a target zone within the object. By locating the zones, processing system 10 indicates specific regions within the object that are most suitable for the realization of the physical, chemical, and other natural processes that create significant features within the object such as ore, oil, and gas deposits. Consequently, processing system 10 provides a user with an indication of the zones within an object having a high probability of containing desired features.

Processing system 10 includes computer 12, which has a suitable input device such as a keyboard, to determine the spatial coherences in the data fields of the physical property or set of physical properties. Computer 12 generates images of an object that includes zones of spatial coherences and displays the images on display screen 13 and, if desired, prints the images on printer/plotter 14. In determining the spatial coherences in the data fields of the physical property or set of physical properties of the object and furnishing a representation of those spatial coherences to a user, processing system 10 optimizes the evaluation process of objects.

Figure 2:
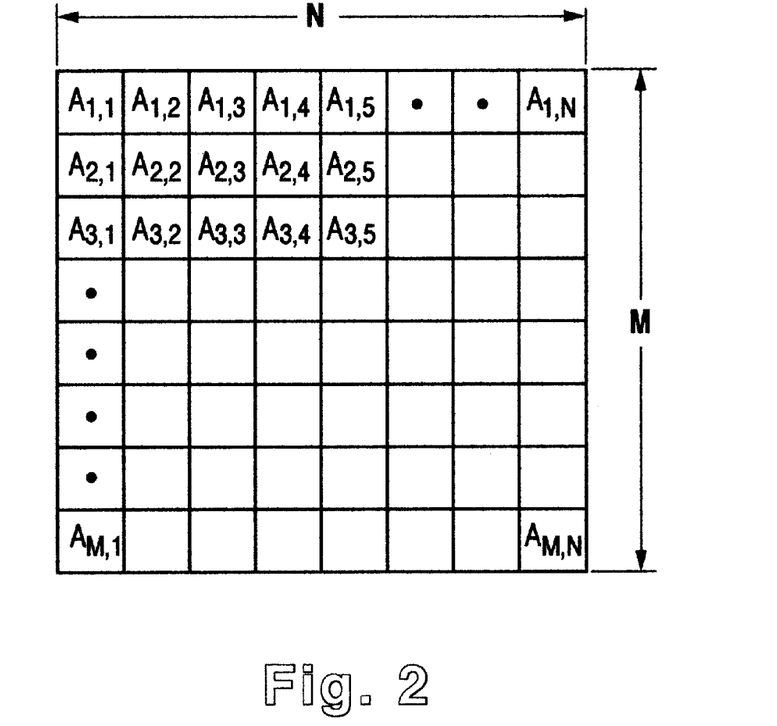
FIG. 2 is a diagram illustrating the format for data of a data field for a parameter or set of parameters within a physical object.

FIG. 2 illustrates the format for the data of the data field representing a physical property of an object. One of instruments 11 measures the physical property to produce data for input into computer 12. Computer 12 stores the data in its memory in a matrix format that includes N columns and M rows. Matrix 15 includes cells $A_{1,1}$–$A_{M,N}$ that correspond to measurement points within the object. The data representation within each cell $A_{1,1}$–$A_{M,N}$ of matrix 15 may be any suitable numeric form and need not be of any particular sign, significant value, or base number system.

For the determination of spatial coherences in the data fields of a set of physical properties of an object, appropriate ones of instruments 11 each measure a physical property to produce data for input into computer 12. Computer 12 inputs the data and stores each physical property data in a separate matrix that includes N columns and M rows and cells $A_{1,1}$–$A_{M,N}$. Furthermore, computer 12 arranges each matrix in its memory such that the individual cells of the matrices remain in "spatial registry". That is, each of the cells having the same row and column determination is aligned in the memory of computer 12 so that computer 12 may easily compare corresponding matrix cells during the determination of spatial coherences in the data fields of the set of physical properties. Although this preferred embodiment organizes the data of the data fields utilizing a matrix format, that format is employed only in as much as it provides an effective arrangement and marking of the individual data of the data fields. Those of ordinary skill in the art will recognize that any format that furnishes coordinates for each individual data of the data field such as a Cartesian coordinate system or multi-dimensional matrix may be substituted.

Figure 3A:
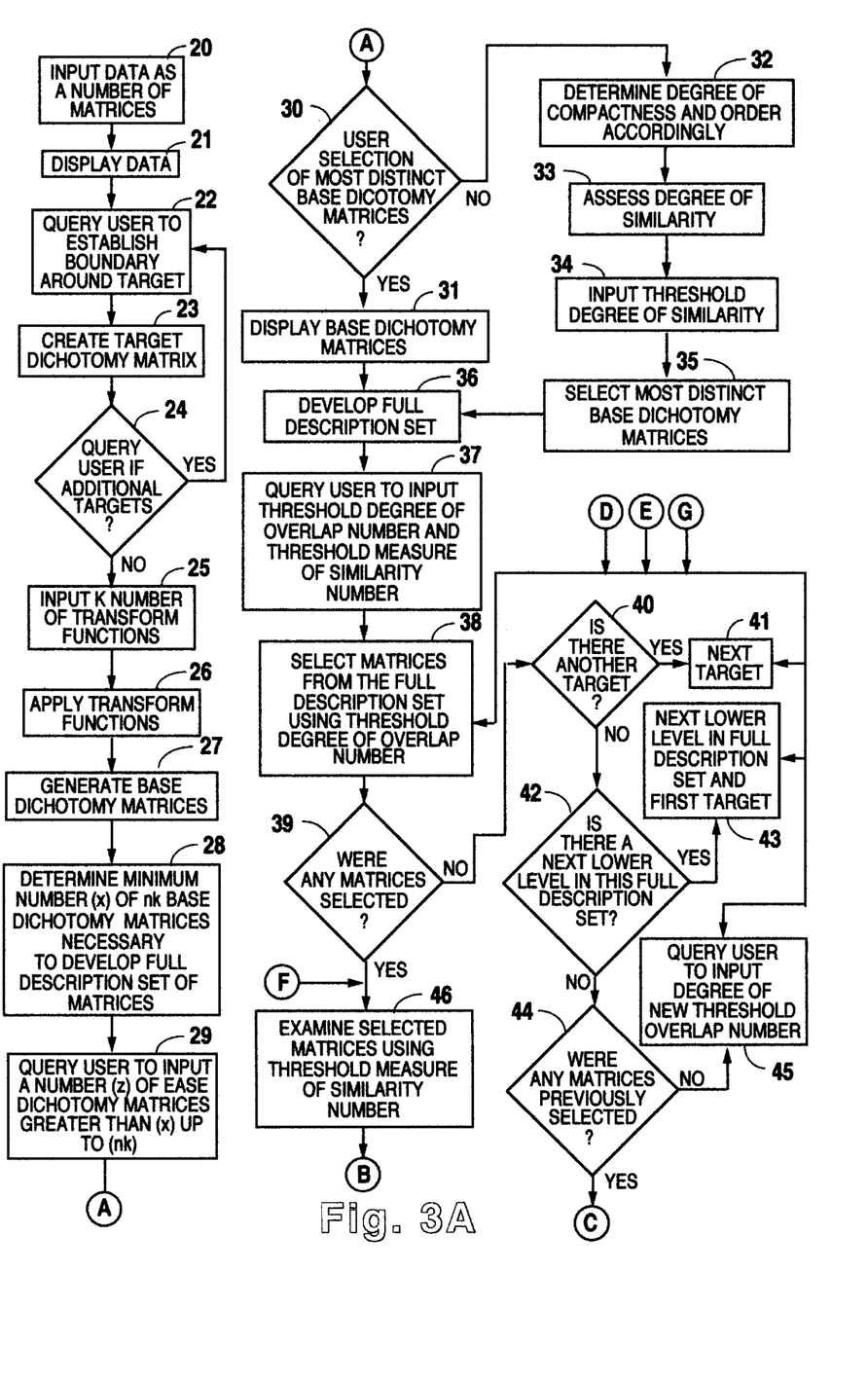
FIGS. 3A and B are flow diagrams illustrating the steps performed by the processing system of FIG. 1.
Figure 3B:
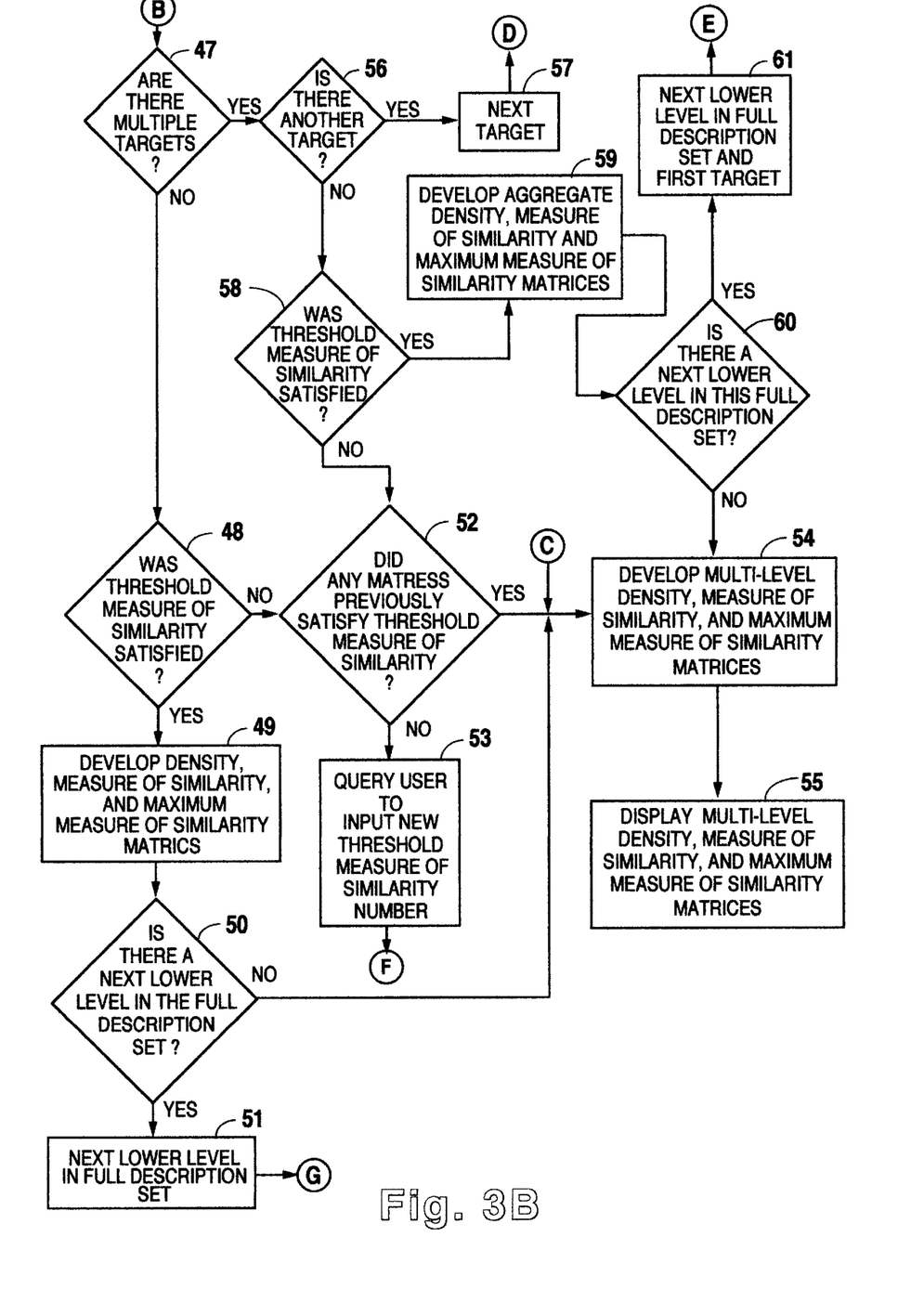

FIG. 3 illustrates the steps performed by computer 12 to determine spatial coherences in the data fields of a physical property or a set of physical properties of an object. In step 20, computer 12 inputs into its memory physical property data of an object as an n number of matrices (n>=1) as previously described. After inputting the n matrices, computer 12 in step 21 displays on display 13 a matrix representing the object so that a target or multiple targets, which may be either completely different targets or a target divided into elemental areas, may be designated. In this preferred embodiment, the target is a known feature that may be significant, such as a gold-quartz outcrop, kimberlite pipe, or oil field.

In step 22, computer 12 queries the user to establish a first target by drawing a boundary around a portion of the matrix including a known feature or, alternatively, designating specific matrix cells that correspond to a known feature. After the user demarcates a known feature to create a target region, computer 12 in step 23 places a logical "1" in each matrix cell within the target region and a logical "0" in each matrix cell outside the target region to generate a first target dichotomy matrix. Although this preferred embodiment uses logical "1's" and "0's", one of ordinary skill in the art will recognize that other symbols may be utilized or that the logical "1's" and "0's" may be reversed.

Once the first target dichotomy matrix has been created, computer 12 in step 24 queries the user if there are additional targets, which may be either completely different targets or a target divided into elemental areas. If there is only one target, computer 12 proceeds to step 25, otherwise, computer 12 repeats steps 22–24. Computer 12 repeats steps 22–24 until all desired target dichotomy matrices have been established.

After creating a target dichotomy matrix or target dichotomy matrices, computer 12 proceeds to step 25 and queries the user to input a k number of transform functions (k>1) to be applied to the data within each of the n matrices. Alternatively, computer 12 could include a predetermined number of transform functions for immediate application to the data in the n matrices. Computer 12 applies the transform functions only to the n matrices and not to the target dichotomy matrix or matrices.

In step 26, computer 12 applies the user selected or predetermined number of k transform functions to the data in each of the n matrices. In applying the k transform functions, computer 12 transforms the data in the n matrices into k number of different data representations with the data resulting from each transform function forming an nk number of transformation matrices stored in memory by computer 12. Similar to the n matrices, computer 12 stores each of the nk transformation matrices in its memory to begin, in the case of a single parameter, or maintain, for multiple parameters, the "spatial registry" that allows easy comparison of matrix cells during the determination of spatial coherences in the data fields of the physical property or properties of the object.

Computer 12 transforms the data in the n matrices to achieve a sufficient diversity in the data that permits the development of a comprehensive description of the object utilizing the initial data fields of a physical property or set of physical properties of the object. Regardless of the number and type of transform functions chosen by the user, computer 12 applies the transform functions uniformly to the data within the n matrices.

In this preferred embodiment, computer 12 applies a "sliding window" technique to transform the data within each cell of the n matrices using the k transform functions to produce the nk transformation matrices. A "sliding window" is a smaller matrix placed within the n matrices and manipulated by computer 12 to control the application of a transform function to an individual cell. The "sliding window" matrix permits computer 12 to use data in surrounding cells in transforming data within an individual cell. Computer 12 utilizes the additional data to ensure an accurate result by providing sufficient input for the transform function. Consequently, the "sliding window" matrix must have a size that incorporates a sufficient number of cells to permit each particular transform function to produce transformed data that is statistically representative of the object. The "sliding window" matrix in this preferred embodiment may be any one of a 7×7, 9×9, 11×11 or 13×13 matrix, however, one of ordinary skill in the art will recognize that other sizes may be substituted.

Computer 12 begins the application of the transform functions by querying the user to select the size of the "sliding window" matrix from the group listed above. Computer 12 applies a transform function to each of the n matrices by sequentially centering the "sliding window" matrix on individual cells. Thus, a "sliding window" matrix in this preferred embodiment has an odd number of rows and columns to provide a center cell. After centering the "sliding window" matrix, computer 12 solves the transform function using the data from all the cells encompassed by the "sliding window" matrix. Once the transform function has been solved, computer 12 stores the result in a nk transformation matrix in a cell of the nk transformation matrix that corresponds to the centered cell of the n matrix being transformed. Computer 12 then moves the "sliding window" matrix and centers it on an adjacent cell to apply the transform function to that cell. Computer 12 continues until all of the n matrices have been transformed using each of the k transform functions to produce nk transformation matrices.

For the purposes of disclosure and to aid in the understanding of the preferred embodiment an illustrative 3 row by 3 column "sliding window" matrix will be described with reference to FIG. 2. To transform the data within cell $A_{2,2}$, the "sliding window" matrix is centered on cell $A_{2,2}$ so that cells $A_{1,1}$–$A_{3,3}$ are encompassed. Computer 12 solves the transform function using the data from cells $A_{1,1}$–$A_{3,3}$ and stores the result in cell $A_{2,2}$ of a nk transformation matrix. Computer 12 then re-centers the "sliding window" matrix on cell $A_{2,3}$ so that cells $A_{1,2}$–$A_{3,4}$ are encompassed. Computer 12 solves the transform function using the data from cells $A_{1,2}$–$A_{3,4}$ and stores the result in cell $A_{2,3}$ of the same nk transformation matrix. Although outer cells are utilized in the transformation of the data within other cells, they are not transformed in this preferred embodiment and are actually excluded from the transformation matrix because the "sliding window" matrix cannot be centered on outer cell, and a statistically representative result of a calculated transform function may only be achieved when calculated for the center cell of the "sliding window" matrix. However, one of ordinary skill in the art will recognize that techniques utilizing the outer cells exist and may be employed. Computer 12 repeats the above described procedure for each cell of matrix 15 until the nk transformation matrix is completed. Computer 12 further applies each of the k transform functions to matrix 15 and to all of the remaining n matrices to create the nk transformation matrices.

Possible transform functions include but are not limited to the following: (1) the difference between the entropy (Shannon's entropy) of the observed distribution and the entropy under the supposition that all entropy values occur with equal probability; (2) the maximum horizontal gradient; (3) the azimuthal direction of the maximum horizontal gradient; (4) the difference between the median of the values in the "sliding window" matrix and the median of all of the values in the matrix; and (5) Laplacian, Gaussian curvature, and mean curvature geometric characteristics. Although only the above transform functions have been described, those skilled in the art will recognize that any transform function that creates a diverse representation of the data may be utilized.

After applying the k transform functions to each of the n matrices to derive the nk transformation matrices, computer 12 in step 27 generates a base dichotomy from each of the nk transformation matrices to form nk base dichotomy matrices. Each cell of a base dichotomy matrix is marked with the characteristic associated with the transform function used to derive the transformation matrix now utilized by computer 12 to generate the base dichotomy matrix. Computer 12 develops the nk base dichotomy matrices by separating the data within each transformation matrix into two subsets comprised of equal numbers of matrix cells. Computer 12 separates the data of each transformation matrix into two subsets because that representation constitutes the most stable classification of the data and subsequently provides the user with the most natural and convenient form for characterizing the object in terms of useful and not useful parts.

Figure 5:
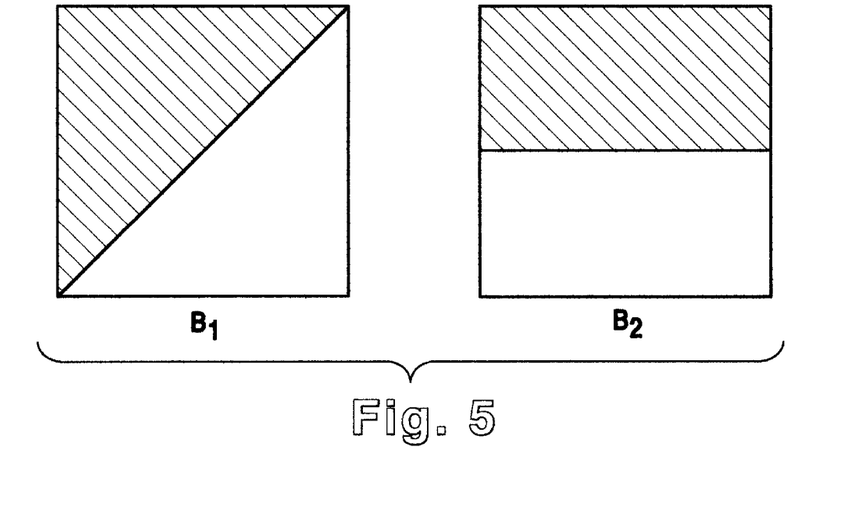
FIG. 5 illustrates hypothetical base dichotomy matrices.

Computer 12 develops a base dichotomy matrix by first determining the median value for a transformation matrix. After calculating the median value, computer 12 compares the median value to the value of the data within each individual cell of the nk transformation matrix. When the value of the data within an individual cell exceeds the median value, computer 12 stores a logical "1" in the base dichotomy matrix in a cell of the base dichotomy matrix that corresponds to the cell of the transformation matrix. Conversely, if the median value exceeds the value of the data within an individual cell, computer 12 stores a logical "0" in the base dichotomy matrix in a cell of the nk base dichotomy matrix that corresponds to the cell of the nk transformation matrix. If the value of the data within any individual cell equals the median value, computer 12 waits until the completion of all the comparisons before deciding whether the individual cell receives a logical "1" or a logical "0". At the completion of the comparisons, computer 12 divides remaining cells and randomly assigns logical "1's" and logical "0's". In the event there are an odd number of remaining cells, computer 12 randomly assigns a logical "1" or logical "0" to the odd cell. Computer 12 repeats the above procedure for each of the nk transformation matrices until it has formed each of the nk base dichotomy matrices. FIG. 5 illustrates matrices B1 and B2 that are matrices from a hypothetical set of nk base dichotomy matrices. The shaded region represents the logical "1's" and the unshaded region represents the logical "0's".

In each of the nk base dichotomy matrices, the cells assigned a logical "1" and the cells assigned a logical "0" form two non-overlapping subsets containing an equal number of uniform elements for each of the nk transformation matrices. However, those skilled in the art will recognize that the subsets may include a mild inequality between the number of logical "1's" and logical "0's" of the subsets without impairing the determination of spatial coherences in the data fields of the physical property or set of physical properties of the object. Additionally, computer 12 stores each of the nk base dichotomy matrices in its memory to maintain the "spatial registry" that permits easy comparison of the individual matrix cells during the determination of spatial coherences. Although this preferred embodiment uses the median in forming the nk base dichotomy matrices, those skilled in the art will recognize that many other methods may be utilized.

In this preferred embodiment, computer 12 in step 28 determines the minimum number (x) of nk base dichotomy matrices necessary to develop a full description set of matrices. A minimum number (x) must be employed to ensure the full description set of matrices provides a statistically accurate representation of the object. Computer 12 determines the number (x) of nk base dichotomy matrices by solving for x utilizing the formula $1/2^x \approx$ target size/object size. Size in this preferred embodiment is measured in terms of area, volume, or any other type of measurement that fixes boundaries.

After determining the minimum number (x), computer 12 in step 29 queries the user to input a number (z) of base dichotomy matrices actually used in creating the full description set of matrices. The number (z) may be the minimum number (x) up to the entire set of nk base dichotomy matrices, however, the number (z) is typically greater than the number (x) to supply a number of matrices in the full description set sufficient to provide a statistically meaningful determination of spatial coherences. Furthermore, the number (z) is typically less than the entire set of nk number of base dichotomy matrices because using increased numbers of base dichotomy matrices expands necessary computing power and time without yielding a substantially more meaningful determination of spatial coherences. For the purposes of disclosure and to aid in the understanding of this preferred embodiment, an example minimum number (x) may be fifteen (15). If the minimum number (x) is fifteen (15), the number (z) of base dichotomies that will render a meaningful determination of spatial coherences without unnecessarily increasing required computing power and time is twenty (20).

Since the number (z) in most instances is less than the entire set of nk base dichotomy matrices, either the user or computer 12 selects a number (z) of most distinct base dichotomy matrices from the entire set of nk base dichotomy matrices. In step 30, computer 12 queries whether the user desires to decide which of the nk base dichotomy matrices will form the set of z most distinct base dichotomy matrices.

If the user desires to select the z most distinct base dichotomy matrices, computer 12 proceeds to step 31 and displays each of the nk base dichotomy matrices on display 13 and, if desired, prints each of the nk base dichotomy matrices using printer/plotter 14 (see FIG. 1). The user then examines each of the nk base dichotomy matrices to decide the z number of most distinct. After determining the z most distinct base dichotomy matrices, the user employs an input device such as a keyboard to inform computer 12 of the z most distinct matrices selected. After receiving the selected z most distinct matrices from the user, computer 12 proceeds to step 36 and utilizes the z number of selected most distinct matrices in forming the full description set.

Figure 4A:
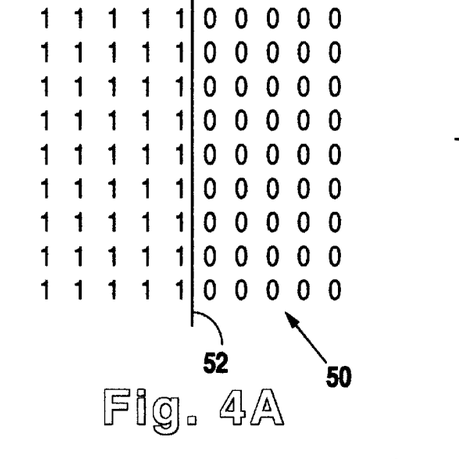
FIGS. 4A–C illustrate hypothetical base dichotomy matrices and the boundary lines utilized in determining a degree of compactness.
Figure 4B:
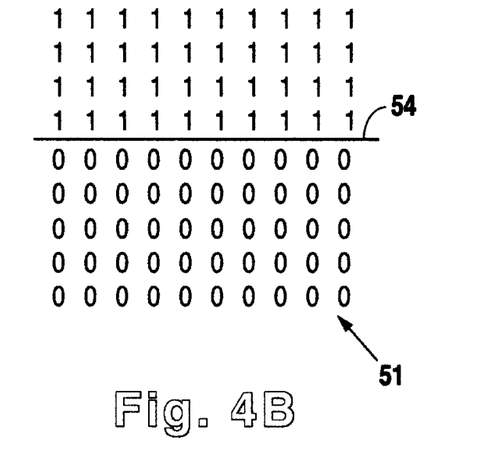
Figure 4C:
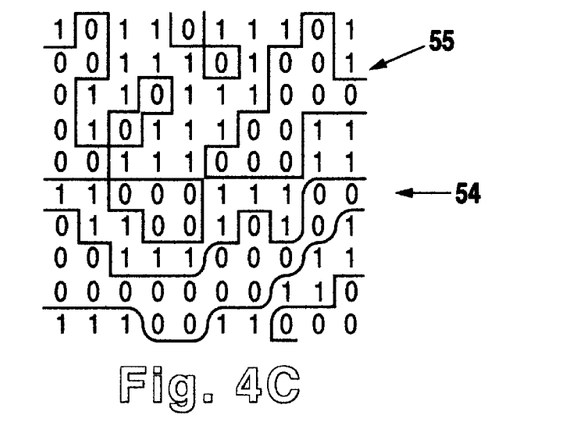

Alternatively, if the user selects computer 12 to determine the z most distinct base dichotomy matrices, computer 12 in step 32 determines the degree of compactness for each of the nk base dichotomy matrices. Computer 12 determines the degree of compactness for each of the nk base dichotomy matrices by developing an aggregate length for a boundary line that separates the logical "1s" from the logical "0's". However, one of ordinary skill in the art will recognize that other techniques to determine degree of compactness may be used. FIGS. 4A and B illustrate matrices 50 and 51 that have a maximum degree of compactness. FIG. 4C illustrates matrix 54 that has a lesser degree of compactness than matrices 50 and 51 because the logical "1's" and "0's" are more randomly distributed. Thus, boundary line 55 must wind about the logical "1's" and "0's" to separate them and has a length greater than boundary lines 52 and 53. A matrix having a minimal degree of compactness has alternating logical "1's" and "0's" among its cells.

Computer 12 develops a boundary line for each of the nk base dichotomy matrices and measures its aggregate length using any one of several well known methods. Illustratively, computer 12 sequentially traverses the individual matrix cells along the columns and then the rows of an nk base dichotomy matrix and increases a boundary line length count by one each time it detects a change between adjacent matrix cells from either a logical "0" to a logical "1" or a logical "1" to a logical "0". The resulting boundary line length count is the aggregate length of the boundary line and, therefore, reflects the degree of compactness of the nk base dichotomy matrix.

After determining the degree of compactness, computer 12 orders the nk base dichotomy matrices from the most compact to the least compact. That is, computer 12 arranges the nk base matrices in its memory from the most compact (i.e., the matrix having the shortest aggregate boundary line) to the least compact (i.e., the matrix having the longest aggregate boundary line).

Once computer 12 has ordered the nk base dichotomy matrices, it in step 33 pairwise compares each base dichotomy matrix with each remaining base dichotomy matrix to assess the degree of similarity between each pair of base dichotomy matrices by developing a degree of similarity number. To produce a degree of similarity number for a first and second pair of base dichotomy matrices, computer 12 first creates a logical number pair matrix for that pair of base dichotomy matrices. Computer 12 creates the logical number pair matrix by comparing the individual cells of the first base dichotomy matrix with each corresponding individual cell of the second base dichotomy matrix to determine the resulting logical number pairs ("00", "01", "10", and "11") for each pair of matrix cells. Computer 12 then places the resulting logical number pairs in matrix cells of the logical number pair matrix that correspond to the matrix cells of the first and second base dichotomy matrices.

Illustratively, matrix cell $A_{1,1}$ of the first base dichotomy matrix would be compared with matrix cell $A_{1,1}$ of the second base dichotomy matrix. If matrix cell $A_{1,1}$ of the first base dichotomy matrix included a logical "0", the resulting logical number pair would be either "00" or "01" depending upon the logical number within matrix cell $A_{1,1}$ of the second base dichotomy matrix. Similarly, if matrix cell $A_{1,1}$ of the first base dichotomy matrix included a logical "1", the resulting logical number pair would be either "10" or "11" depending upon the logical number within matrix cell $A_{1,1}$ of the second base dichotomy matrix. Regardless of the resulting logical number pair, computer 12 would place that logical number pair in matrix cell $A_{1,1}$ of the resulting logical number pair matrix.

After developing the logical number pair matrix for the first and second base dichotomy matrices, computer 12 counts the frequency of occurrence for each logical number pair within the logical number pair matrix and divides those frequencies of occurrence by the total number of matrix cells in the logical number pair matrix. The resulting numbers reflect the proportions of each logical number pair within the logical number pair matrix. Computer 12 develops the degree of similarity number for the first and second base dichotomy matrices by adding the proportion numbers for the logical number pairs "00" and "11" together and the proportion numbers for the logical number pairs "01" and "10" together and selecting the greater sum as the degree of similarity number. Illustratively, if the sum of the logical number pairs "00" and "11" is 0.2 while the sum of the logical number pairs "01" and "10" is 0.8, computer 12 selects 0.8 as the degree of similarity number. Similarly, if the sum of the logical number pairs "01" and "10" is 1.0 while the sum of the logical number pairs "00" and "11" is 0.0, computer 12 selects 1.0 as the degree of similarity number. When the sum of the logical number pairs "00" and "11" and the sum of the logical number pairs "01" and "10" both equal 0.5, computer 12 merely utilizes 0.5 as the degree of similarity number. Computer 12 repeats the above-described procedure until it develops a degree of similarity number for each pair of base dichotomy matrices of the ordered base dichotomy matrices.

Once computer 12 develops the degree of similarity numbers, it queries the user in step 34 to input a threshold degree of similarity number ranging from 0.5 to 1.0. After receiving the threshold degree of similarity number, computer 12 in step 35 selects the z most distinct base dichotomy matrices. Computer 12 begins by attempting to organize the base dichotomy matrices into a z number of clusters of matrices in accordance with the value of the input threshold degree of similarity number. Computer 12 begins by placing any base dichotomy matrix that does not have a degree of similarity number with any other matrix above the threshold value in its own cluster. Computer 12 then places the base dichotomy matrices having a degree of similarity number with another base dichotomy matrix above the threshold value in clusters arranged such that all the base dichotomy matrices in any one cluster have a degree of similarity number above the threshold value with every other base dichotomy matrix in that cluster.

Illustratively, a first base dichotomy matrix having a degree of similarity number greater than the threshold value with both a second and third base dichotomy will form a cluster with the second and third base dichotomies provided that the second base dichotomy matrix has a degree of similarity number with the third base dichotomy matrix greater than the threshold value. If the second and third base dichotomy matrices have a degree of similarity number less than the threshold value, the first base dichotomy forms a separate cluster with each of the second and third base dichotomy matrices.

If computer 12 is unable to form a z number of clusters that include each base dichotomy matrix and, instead, forms less than z clusters, it informs the user the threshold value is too low and queries the user to input a new threshold value. Conversely, if computer 12 forms more than z clusters, it informs the user the threshold value is too high and queries the user to input a new threshold value. Although, in this preferred embodiment, computer 12 requests the user to input a new threshold value, one of ordinary skill in the art will recognize that computer 12 could automatically adjust the threshold until a z number of clusters is formed.

Figure 6:
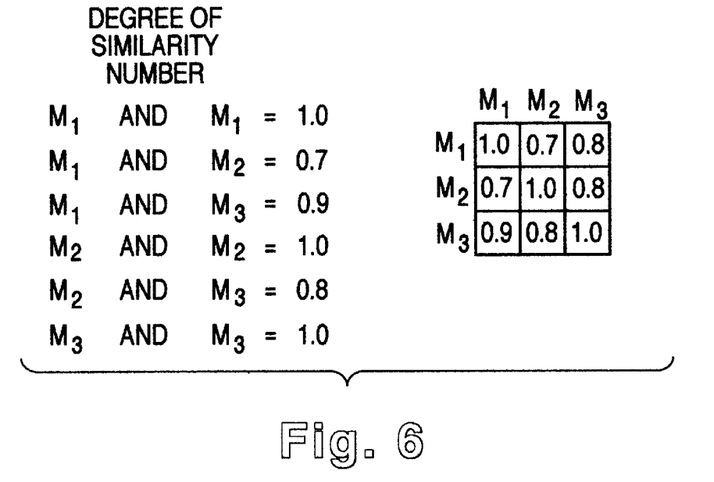
FIG. 6 illustrates the determination of the most representative matrix in a cluster of matrices.

Once computer 12 receives a threshold value that results in the formation of z clusters of base dichotomy matrices, it must select the most representative base dichotomy matrix from each of the z clusters. Any cluster including only a single base dichotomy matrix as described above immediately becomes one of the z most distinct base dichotomy matrices and does not undergo the following steps. To determine the most representative base dichotomy matrix of any cluster, computer 12 creates a matrix using the degree of similarity numbers developed between each of the base dichotomy matrices of the cluster (see FIG. 6). Each base dichotomy matrix of the cluster is placed on a row and column of the matrix, and the corresponding degree of similarity numbers are placed in the matrix in accordance with the position of the particular base dichotomy matrices. Illustratively, matrix $M_1$ is placed on row1 and column1, while matrix $M_3$ is placed on row3 and column 3 so their degree of similarity number of 0.9 is positioned in row1, column3 and row3,column1. Rows and columns that have the same base dichotomy matrix receive a degree of similarity number of 1.0.

After forming the degree of similarity number matrix, computer 12 calculates the total determinant for the degree of similarity number matrix. Computer 12 then removes the first row and column of the degree of similarity number matrix and calculates a partial determinant without that row and column. Similarly, computer 12 replaces the first row and column, removes the second row and column, and calculates a partial determinant without the second row and column. Computer 12 sequentially replaces and removes the rows and columns and calculates a partial determinant until the last row and column has been removed. Once all the partial determinants have been calculated, computer 12 compares the partial determinants to the total determinant to determine which partial determinant has a value nearest to the total determinant. The base dichotomy matrix forming the row and column that when removed produced the partial determinant nearest in value to the total determinant is the most representative base dichotomy matrix of the cluster. If there are two or more base dichotomy matrices with partial determinants identical and nearest in value to the total determinant, computer 12 selects the most compact matrix as the most representative base dichotomy matrix of the cluster.

Computer 12 performs the above-procedure for each cluster until the z most distinct base dichotomy matrices have been selected. Computer 12 then lists the z most distinct base dichotomy matrices in its memory from the most compact to the least compact using the method of determining compactness as previously described. Although computer 12 has been described as selecting the most representative base dichotomy matrix from a cluster, those skilled in the art will recognize that computer 12 could display or print the clusters so that the user could make the selection of the most representative base dichotomy matrix from each cluster.

In step 36, computer 12 utilizes the selected z most distinct base dichotomy matrices to develop the full description set of matrices. Computer 12 begins by creating a companion matrix for each of the z most distinct base dichotomy matrices. The companion matrices consist of the inverse for each of the z most distinct base dichotomy matrices. Computer 12 develops the companion matrices to eliminate a comparison between matrix cells using a logical "0".

Figure 7:
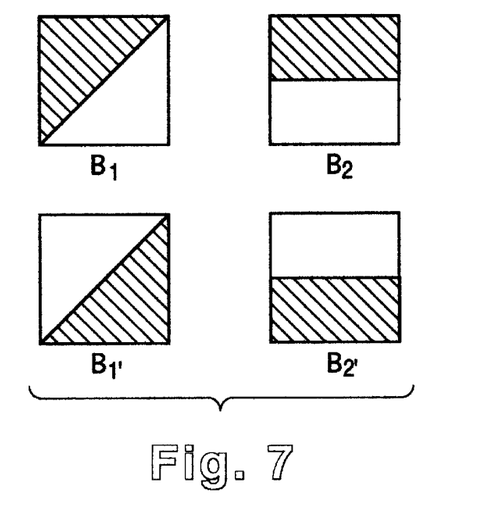
FIG. 7 illustrates the hypothetical base dichotomy matrices of FIG. 5 and their companion matrices.

To form a companion matrix, computer 12 substitutes a logical "0" in the cells of a most distinct base dichotomy matrix containing a logical "1" and a logical "1" in the cells containing a logical "0". Computer 12 performs the above procedure for each matrix of the z most distinct base dichotomy matrices to produce a complete set of companion matrices. After developing the companion matrices, computer 12 stores in its memory each most distinct base dichotomy matrix with its companion matrix directly adjacent to form a base level of matrices. Additionally, computer 12 maintains the "spatial registry" among corresponding matrix cells and orders the base level matrices from the most compact to the least compact. FIG. 7 illustrates matrices B1 and B2 of FIG. 5 and their companion matrices B1' and B2'.

After forming the base level of matrices, computer 12 develops a full description set of matrices utilizing the matrices from the base level. Computer 12 develops the full description set by intersecting higher numbers of matrices from the base level to build intersection levels of matrices. Computer 12 begins by intersecting the base level matrices in pairs to form a second level of intersection. Specifically, computer 12 intersects each base level matrix with the remaining base level matrices to form pair intersection matrices until each base level matrix has been intersected with all other base level matrices.

Computer 12 generates a pair intersection matrix by logically "AND'ing" each individual cell in a first base level matrix with each corresponding individual cell of a second base level matrix. Each matrix cell of the resulting pair intersection matrix will have a value of logical "0" unless both corresponding matrix cells of the first and second base level matrices include values of logical "1". Illustratively, matrix cell $A_{1,1}$ of the first base level matrix would be logically "AND'ed" with matrix cell $A_{1,1}$ of the second base level matrix to determine the value placed in matrix cell $A_{1,1}$, of the resulting pair intersection matrix. That value will be a logical "0" unless matrix cell $A_{1,1}$ of both the first and second base level matrices contains a logical "1".

Figure 8:
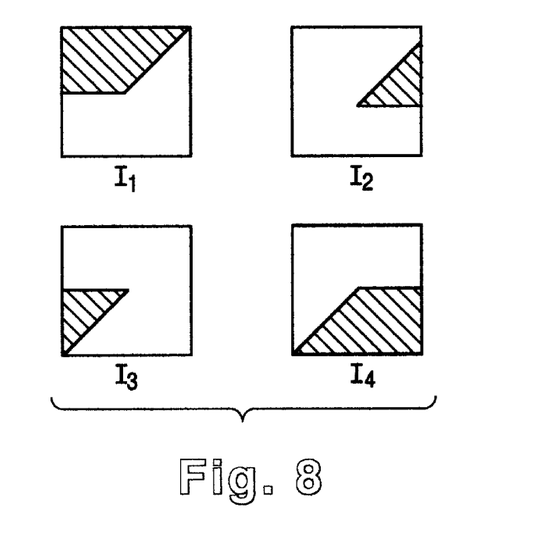
FIG. 8 illustrates intersection matrices formed through the intersection of the hypothetical base dichotomy matrices of FIG. 5 and their companion matrices.

FIG. 8 illustrates matrices I1, I2, I3, and I4 that are matrices resulting from intersections among matrices B1 and B2 and their companion matrices B1' and B2'. Matrix I1 results from the intersection of matrices B1 and B2. Matrix I2 results from the intersection of matrices B1' and B2. Matrix I3 results from the intersection of matrices B1 and B2'. Matrix I4 results from the intersection of matrices B1' and B2'.

Computer 12 then intersects the base level matrices in triples to form a third level of intersection. Computer 12 intersects combinations of three base level matrices to form triple intersection matrices until all possible combinations of three base level matrices have been intersected. Next, computer 12 intersects the base level matrices in quadruples to form a fourth level of intersection. Computer 12 intersects combinations of four base level matrices to form quadruple intersection matrices until all possible combinations of four base level matrices have been intersected. Computer 12 sequentially intersects higher numbers of base level matrices until it intersects all the base level matrices together to form the z or highest level intersection. Computer 12 stores each intersection level of matrices in its memory including the base level of matrices to form the full description set which is then utilized in determining spatial coherences in the object.

As a result of the intersections described above, each matrix in the full description set created through the intersection of base level dichotomy matrices inherits the characteristics of those base dichotomy matrices. Consequently, the full description set has a hierarchical structure where the base (first) level dichotomy matrices include one characteristic, the second level intersection matrices include two characteristics, the third level intersection matrices include three characteristics, the fourth level intersection matrices include four characteristics, and up to the z or highest level of intersection matrix which includes characteristics from each of the base level dichotomy matrices. Although the formation of the full description set of matrices has been described in a sequential manner, one of ordinary skill in the art will recognize that computer 12 could simultaneously generate the full description set.

After developing the full description set, computer 12 in step 37 queries the user to input a threshold degree of overlap number that, in this preferred embodiment, varies from over 0.5 to 1.0 and a threshold measure of similarity number that, in this preferred embodiment, varies from 0.0 to 1.0. Computer 12 uses the input threshold degree of overlap number and threshold measure of similarity number to select matrices from the full description set that exhibit structural similarity to a first target dichotomy matrix.

In this preferred embodiment, computer 12 in step 38 selects matrices from the full description set beginning at the level corresponding to the minimum number x. As per the previous illustration, computer 12 would begin at the 15th level although there are a total of 20 levels in the full description set. Computer 12 in this preferred embodiment begins at the x level because the x level may be the highest level that satisfies both the threshold degree of overlap number and the threshold measure of similarity number in accordance with the formula $\frac{1}{2}^x$. Although in this preferred embodiment computer 12 begins in the full description set at the x level, one of ordinary skill in the art will recognize that computer 12 could begin at any level from the first through the z.

Computer 12 begins by comparing a subset of each matrix from the x level of intersection in the full description set to the target region of the target dichotomy matrix to determine the degree of overlap. Computer 12 determines the degree of overlap by counting the number of cells in the target region that overlap the logical "1's" subset of each x level intersection matrix. Computer 12 then divides the number of cells that overlap the logical "1's" subset of each x level intersection matrix by the total number of cells in the target region to calculate a "1's" overlap number for each x level intersection matrix. When the "1's" overlap number for any one of the x level intersection matrices equals or exceeds the threshold degree of overlap number input by the user, computer 12 selects that x level intersection matrix. Although the above method of determining whether a matrix satisfies the threshold degree of overlap number has been described for the x intersection level, those of ordinary skill in the art will recognize that the method is identical when applied to other intersection levels and the selected most distinct base dichotomy matrices.

Upon the completion of step 38, computer 12 proceeds to step 39 and determines if any matrices satisfied the threshold degree of overlap number. In this instance, computer 12 checks if any matrices from the x intersection level have been selected. When no matrices have been selected, computer 12 executes step 40 by determining if there are additional target dichotomy matrices. When there are additional target dichotomy matrices, computer 12 in step 41 advances to the next target dichotomy matrix and then repeats step 38 at the same intersection level.

If there is only one target dichotomy matrix or all target dichotomy matrices have been used without the selection of an intersection matrix, computer 12 proceeds to step 42 and determines whether there is a next lower level of intersection matrices. When there is a level of intersection matrices below the current intersection level, which in this instance is the x level, computer 12 executes step 43 by advancing to that next lower level and returning to the first target dichotomy matrix if there are multiple target dichotomy matrices. Computer 12 then re-executes step 38 using the first target dichotomy matrix at the next lower level.

Upon the determination there is no next lower intersection level, computer 12 proceeds to step 44 and determines if matrices from any intersection level have been selected. When all intersection levels of the full description set including the most distinct base dichotomies have been traversed without the selection of any matrices satisfying the threshold degree of overlap number, computer 12 in step 45 queries the user to input a new threshold degree of overlap number. Computer 12 then re-executes step 38 at the x intersection level using the new threshold degree of overlap number and the first target dichotomy matrix. Alternatively, when matrices have been selected, computer 12 executes step 52 (described herein).

If computer 12 in step 39 determines one or more intersection matrices satisfied the threshold degree of overlap number, it proceeds to step 46 and develops a value (C) representing the measure of similarity between selected intersection matrices and the target dichotomy matrix using the formula $C=1-[H(x,y)-H(y)]$ where H is Shennon's entropy. In this instance, computer 12 develops a value (C) for each selected x level intersection matrix. $H(x,y)$ is the entropy of the joint distribution of logical number pairs (i.e., 00, 01, 10, 11) in each selected x level intersection matrix and the target dichotomy matrix. $H(y)$ is the entropy of the distribution of logical "1's" and logical "0's" in the target dichotomy matrix.

Computer 12 develops $H(x,y)$ for each selected x level of intersection matrix by determining the negative summation of the frequency of each logical number pair ($P_{00-11}$) times the logarithm of the frequency of each logical number pair ($P_{00-11}$) which in formula form appears as $-(P_{00}*\log P_{00}+ P_{01}*\log P_{01}+P_{10}*\log P_{10}+P_{11}*\log P_{11})$. Computer 12 calculates $H(x,y)$ by first determining the logical number pairs for the target dichotomy matrix and each selected x level intersection matrix. Computer 12 overlays the target dichotomy matrix on each selected x level intersection matrix and determines the resulting logical number pair for each matrix cell. Computer 12 counts the numbers of each logical number pair and then divides each of those four numbers by the total number of logical number pairs to calculate a frequency of each logical number pair. Computer 12 then substitutes each of the four probabilities of logical number pairs into the above formula to determine $H(x,y)$.

Computer 12 develops $H(y)$ for the target dichotomy matrix by determining the negative summation of the frequency of logical "0's" and logical "1's" ($P_{0\ and\ 1}$) times the logarithm of the frequency of logical "0's" and logical "1's" ($P_{0\ and\ 1}$) which in formula form appears as $-(P_0*\log P_0+P_1*\log P_1)$. To calculate $H(y)$, computer 12 counts the number of logical "0's" and logical "1's" of the target dichotomy matrix and then divides those two numbers by the total number of cells in the target dichotomy matrix. Computer 12 then substitutes each of the two probabilities into the above formula to determine $H(y)$.

Once computer 12 determines $H(x,y)$ and $H(y)$, it subtracts $H(y)$ from $H(x,y)$ to ascertain the measure of similarity number (C) for each selected x level intersection matrix. Computer 12 then compares the calculated measure of similarity number (C) to the threshold measure of similarity number to determine if the calculated measure of similarity for each selected x level intersection matrix lies within the threshold measure of similarity number. When a selected x level of intersection matrix has a measure of similarity number equal to or greater than the threshold measure of similarity number input by the user, computer 12 stores that selected x level intersection matrix in its memory. Although the above method of determining whether a matrix satisfies the threshold measure of similarity number has been described for the x intersection level, those of ordinary skill in the art will recognize that the method is identical when applied to other intersection levels and the selected most distinct base dichotomy matrices.

After examining intersection matrices that satisfied the threshold degree of overlap number to determine if they also satisfy the threshold measure of similarity number, computer 12 proceeds to step 47 and determines if there are multiple target dichotomy matrices. Computer 12 executes step 48 when there is a single target dichotomy matrix and step 56 (described herein) when there are multiple target dichotomy matrices. In step 48, computer 12 determines whether any intersection matrices satisfied the threshold measure of similarity number. In this instance, computer 12 checks if any matrices from the x intersection level were selected because they satisfied the threshold measure of similarity number.

When intersection matrices have been selected, computer 12 executes step 49, otherwise, computer 12 executes step 52 (described herein). In step 49, computer 12 develops a density matrix, a measure of similarity matrix, and a maximum measure of similarity matrix. Although this preferred embodiment develops a density matrix, a measure of similarity matrix, and a maximum measure of similarity matrix, one of ordinary skill in the art will recognize that many other matrices reflecting spatial coherences among features of an object may be constructed by carrying out various mathematical operations involving the selected intersection matrices.

Computer 12 constructs the density matrix by determining a density number for each cell of the density matrix, which is the number of selected intersection matrices that include a logical "1" in the same cell. When there are no intersection matrices that include a logical "1" in the same cell of the density matrix, computer 12 places a 0 in the cell. After developing a density number for each cell, computer 12 normalizes each density number through division by the total number of matrices in the intersection level. Computer 12 completes the density matrix by writing each normalized density number into its appropriate cell. Although this preferred embodiment normalizes each density number by dividing each density number by the total number of matrices at the intersection level, one of ordinary skill in the art will recognize that the density numbers may be utilized unnormalized or that other methods of normalization may be substituted.

Computer 12 constructs the measure of similarity matrix by developing a similarity number for each cell of the measure of similarity matrix, which is based on the number of selected intersection matrices that include a logical "1" in the same cell. When there is one intersection matrix that includes a logical "1" in a cell of the measure of similarity matrix, the similarity number is the measure of similarity number (C) of that particular intersection matrix. Similarly, if there are two or more intersection matrices that include a logical "1" in a cell of the measure of similarity matrix and their measure of similarity of numbers (C) are identical, the similarity number is the identical measure of similarity number (C). Alternatively, when there are two or more intersection matrices that include a logical "1" in a cell of the measure of similarity matrix and their measure of similarity of numbers (C) are different, computer 12 normalizes the measure of similarity numbers using the formula $\Sigma C-C_{min}/C_{max}-C_{min}$ which is the sum of the measure of similarity numbers minus the minimum measure of similarity number divided by the maximum measure of similarity number minus the minimum measure of similarity number. Although this preferred embodiment normalizes each similarity number utilizing the formula $\Sigma C - C_{min}/C_{max} - C_{min}$, one of ordinary skill in the art will recognize that the similarity numbers may be utilized, unnormalized or other methods of normalization may be substituted. When there are no intersection matrices that include a logical "1" in the same cell of the measure of similarity matrix, computer 12 places a 0 in the cell to indicate it has been discarded. After developing a similarity number for each cell, computer 12 completes the measure of similarity matrix by writing each similarity number into its appropriate cell.

Computer 12 develops a maximum measure of similarity matrix by examining each selected intersection matrix to determine which selected intersection matrix has the highest measure of similarity to the target region of the target dichotomy matrix. Computer 12 then stores in its memory as the maximum measure of similarity matrix the selected intersection matrix that has the highest measure of similarity to the target region of the target dichotomy matrix.

Computer 12 proceeds to step 50 and determines whether there is a next lower level of intersection matrices. When there is a level of intersection matrices below the current intersection level, which in this instance is the x level, computer 12 executes step 51 by advancing to that next lower level. Computer 12 then re-executes step 38 using the target dichotomy matrix at the next lower level. Upon the determination there is no next lower intersection level, computer 12 executes step 54 (described herein).

Computer 12 executes steps 38–51 as previously described to develop a density matrix, a measure of similarity matrix, and a maximum measure of similarity matrix for each successive next lower level of intersection matrices in the full description set until one of two conditions are satisfied. The first condition which is examined in step 48 determines if there were any matrices in the current intersection level of the full description set that satisfied the threshold measure of similarity number. The checking of whether the threshold measure of similarity number has been satisfied provides a lower limit that informs computer 12 when a sufficient number of intersection levels have been traversed to furnish an accurate determination of spatial coherences in the object.

Consequently, computer 12 proceeds to step 52 and determines if any matrices at any intersection level satisfied the threshold measure of similarity number. When matrices from at least one intersection level have been selected, computer 12 executes step 54 (described herein). Upon determining no matrices at any intersection level satisfied the threshold measure of similarity number, computer 12 proceeds to step 53 and queries the user to input a new threshold measure of similarity number. Computer 12 then re-executes step 46 using the new threshold measure of similarity number. Steps 52 and 53, therefore, prevent a situation where the threshold measure of similarity number is set such that no matrices from the x level are selected.

The second condition which is examined in step 50 determines if there is a next lower level of matrices in the full description set. Step 50 is employed when the user desires to develop a density matrix, a measure of similarity matrix, and a maximum measure of similarity matrix for all the levels of the full description set which includes the most distinct base dichotomies.

To develop a density matrix, a measure of similarity matrix, and a maximum measure of similarity matrix for all the levels of the full description set, the user enters a threshold measure of similarity number of 0.0 so that all matrices selected from the full description set will satisfy the threshold measure of similarity number. Consequently, when computer 12 determines there is no next lower level of matrices in the full description set, it executes step 54. Although this preferred embodiment utilizes a threshold degree of similarity number to limit the level of intersection within the full description set examined by computer 12, one of ordinary skill in the art will recognize that the user could be prompted to input an arbitrarily selected level of intersection within the full description set.

In step 54, computer 12 develops a multi-level density matrix, a multi-level measure of similarity matrix, and a multi-level maximum measure of similarity matrix. Although this preferred embodiment develops a multi-level density matrix, a multi-level measure of similarity matrix, and a multi-level maximum measure of similarity matrix, one of ordinary skill in the art will recognize that many other matrices reflecting spatial coherences among features of an object may be constructed by carrying out various mathematical operations involving the selected intersection matrices.

Computer 12 constructs the multi-level density matrix by vertically combining all the density matrices created at each level. Computer 12 vertically combines the density matrices by summing the normalized density numbers in corresponding cells of each density matrix and then writing the sum of the normalized density numbers into an appropriate corresponding cell of the multi-level density matrix. Illustratively with reference to the specific matrix cell $A_{1,2}$, computer 12 takes the normalized density number in each cell $A_{1,2}$ of each density matrix, sums those normalized density numbers, and then writes the sum of those normalized density numbers in cell $A_{1,2}$ of the multi-level density matrix.

Computer 12 constructs a multi-level measure of similarity matrix by vertically combining all the measure of similarity matrices created at each level. Computer 12 vertically combines the measure of similarity matrices by summing the similarity numbers in corresponding cells of each measure of similarity matrix and then writing the sum of the similarity numbers into an appropriate corresponding cell. Illustratively with reference to the specific matrix cell $A_{1,2}$ computer 12 takes the similarity number in each cell $A_{1,2}$ of each measure of similarity matrix, sums those similarity numbers, and then writes the sum of those similarity numbers in cell $A_{1,2}$ of the multi-level measure of similarity matrix.

Computer 12 develops a multi-level maximum measure of similarity matrix by examining the maximum measure of similarity matrix at each level to determine which of those matrices has the highest measure of similarity to the target region of the target dichotomy matrix. Computer 12 selects the maximum measure of similarity matrix with the highest measure of similarity to the target region and stores that matrix as the multi-level maximum measure of similarity matrix.

After developing a multi-level density matrix, a multi-level measure of similarity matrix, and a multi-level maximum measure of similarity matrix, computer 12 displays those matrices on display 13 and/or prints them on printer/plotter 14. Although computer 12 in this preferred embodiment develops a multi-level density matrix, a multi-level measure of similarity matrix, and a multi-level maximum measure of similarity matrix, it should be understood by those of ordinary skill in the art that the multi-level density matrix contains the comprehensive information about the spatial coherences among features within an object. The multi-level density matrix establishes based on the density of the intersections the spatial coherences within the object most likely to host the development of a highly organized zone within the object. Similarly, the multi-level measure of similarity matrix establishes based on aggregate measure of similarity to the target region the spatial coherences within the object most likely to host the development of a highly organized zone within the object. The multi-level maximum measure of similarity matrix indicates the most highly organized zones within the object. As a result of developing and displaying the three matrices, the user will be provided with an indication of where target related features will be within an object.

When computer 12 in step 47 concludes there are multiple target dichotomy matrices, it proceeds to step 56 and determines if there are additional target dichotomy matrices that have not been used. When there are additional target dichotomy matrices, computer 12 executes step 57 by advancing to the next target dichotomy matrix. Computer 12 then repeats steps 38–56 using the new target dichotomy matrix at the same level of the full description set. Computer 12 repeats steps 38–47 and 56–57 until it determines in step 56 that all the target dichotomy matrices have been utilized. When computer 12 concludes all the target dichotomy matrices have been used, it proceeds to step 58 and determines whether any intersection matrices were selected because they satisfied the threshold measure of similarity number.

If intersection matrices were selected, computer 12 executes step 59, otherwise, computer 12 executes step 52 (described herein). Although this preferred embodiment develops an aggregate density matrix, an aggregate measure of similarity matrix, and an aggregate maximum measure of similarity matrix, one of ordinary skill in the art will recognize that many other matrices reflecting spatial coherences among features of an object may be constructed by carrying out various mathematical operations involving the selected intersection matrices.

In step 59, computer 12 develops an aggregate density matrix, an aggregate measure of similarity matrix, and an aggregate maximum measure of similarity matrix. Computer 12 constructs the aggregate density matrix by first developing a density matrix with respect to each target dichotomy matrix. Computer 12 develops a density matrix with respect to each target dichotomy matrix using the method previously described in step 49. After developing a density matrix with respect to each target dichotomy matrix, computer 12 develops the aggregate density matrix by summing the normalized density numbers in corresponding cells of each density matrix and then writing the sum of the normalized density numbers into an appropriate corresponding cell of the aggregate density matrix. Illustratively with reference to the specific matrix cell $A_{1,2}$, computer 12 takes the normalized density number in each cell $A_{1,2}$ of each density matrix, sums those normalized density numbers, and then writes the sum of those normalized density numbers in cell $A_{1,2}$ of the aggregate density matrix.

Computer 12 constructs the aggregate measure of similarity matrix by first developing a measure of similarity matrix with respect to each target dichotomy matrix. Computer 12 develops a measure of similarity matrix with respect to each target dichotomy matrix using the method previously described in step 49. After developing a measure of similarity matrix with respect to each target dichotomy matrix, computer 12 develops the aggregate measure of similarity matrix by summing the similarity numbers in corresponding cells of each measure of similarity matrix and then writing the sum of the similarity numbers into an appropriate corresponding cell of the aggregate measure of similarity matrix. Illustratively with reference to the specific matrix cell $A_{1,2}$, computer 12 takes the similarity number in each cell $A_{1,2}$ of each measure of similarity matrix, sums those similarity numbers, and then writes the sum of those similarity numbers in cell $A_{1,2}$ of the aggregate measure of similarity matrix.

Computer 12 develops an aggregate maximum measure of similarity matrix by first designating with respect to each target dichotomy matrix a selected intersection matrix having the highest measure of similarity to the target region of the target dichotomy matrix. After designating a selected intersection matrix for each target dichotomy matrix, computer 12 develops a maximum similarity number for each cell of the aggregate maximum measure of similarity matrix, which is based on the number of selected intersection matrices for each target dichotomy matrix that include a logical "1" in the same cell. When there is only one intersection matrix that includes a logical "1" in a cell of the aggregate maximum measure of similarity matrix, the maximum similarity number is the measure of similarity number (C) of that particular intersection matrix. Similarly, if there are two or more intersection matrices that include a logical "1" in a cell of the aggregate maximum measure of similarity matrix and their measure of similarity of numbers (C) are identical, the maximum similarity number is the identical measure of similarity number (C). Alternatively, when there are two or more intersection matrices that include a logical "1" in a cell of the aggregate maximum measure of similarity matrix and their measure of similarity of numbers (C) are different, the maximum similarity number is the largest measure of similarity number (C) of all the matrices. When there are no intersection matrices that include a logical "1" in the same cell of the aggregate maximum measure of similarity matrix, computer 12 places a 0 in the cell to indicate it has been discarded. After developing a maximum similarity number for each cell, computer 12 completes the aggregate maximum measure of similarity matrix by writing each maximum similarity number into its appropriate cell.

Computer 12 proceeds to step 60 and determines whether there is a next lower level of intersection matrices. When there is a level of intersection matrices below the current intersection level, computer 12 executes step 61 by advancing to that next lower level and returning to the first target dichotomy matrix. Computer 12 then re-executes step 38 using the first target dichotomy matrix at the next lower level. Upon the determination there is no next lower intersection level, computer 12 executes step 54.

Computer 12 executes steps 38–47 and 56–61 to develop an aggregate density matrix, an aggregate measure of similarity matrix, and an aggregate maximum measure of similarity matrix for each successive next lower level of intersection matrices in the full description set until one of two conditions are satisfied. The first condition which is examined in step 58 determines if there were any matrices in the current intersection level of the full description set that satisfied the threshold measure of similarity number. The checking of whether the threshold measure of similarity number has been satisfied provides a lower limit that informs computer 12 when a sufficient number of intersection levels have been traversed to furnish an accurate determination of spatial coherences in the object.

Consequently, computer 12 proceeds to step 52 and determines if any matrices at any intersection level satisfied the threshold measure of similarity number. When matrices from at least one intersection level have been selected, computer 12 executes step 54. Upon determining no matrices at any intersection level satisfied the threshold measure of similarity number, computer 12 proceeds to step 53 and queries the user to input a new threshold measure of similarity number. Computer 12 then re-executes step 46 using the new threshold measure of similarity number. Steps 52 and 53, therefore, prevent a situation where the threshold measure of similarity number is set such that no matrices from the x level are selected.

The second condition which is examined in step 60 determines if there is a next lower level of matrices in the full description set. Step 60 is employed when the user desires to develop an aggregate density matrix, an aggregate measure of similarity matrix, and an aggregate maximum measure of similarity matrix for all the levels of the full description set which includes the most distinct base dichotomies. To develop an aggregate density matrix, an aggregate measure of similarity matrix, and an aggregate maximum measure of similarity matrix for all the levels of the full description set, the user enters a threshold measure of similarity number of 0.0 so that all matrices selected from the full description set will satisfy the threshold measure of similarity number. Consequently, when computer 12 determines there is no next lower level of matrices in the full description set, it executes step 54. Although this preferred embodiment utilizes a threshold degree of similarity number to limit the level of intersection within the full description set examined by computer 12, one of ordinary skill in the art will recognize that the user could be prompted to input an arbitrarily selected level of intersection within the full description set.

In step 54, computer 12 develops a multi-level density matrix, a multi-level measure of similarity matrix, and a multi-level maximum measure of similarity matrix. Although this preferred embodiment develops a multi-level density matrix, a multi-level measure of similarity matrix, and a multi-level maximum measure of similarity matrix, one of ordinary skill in the art will recognize that many other matrices reflecting spatial coherences among features of an object may be constructed by carrying out various mathematical operations involving the selected intersection matrices.

Computer 12 constructs the multi-level density matrix by vertically combining all the aggregate density matrices created at each level. Computer 12 vertically combines the aggregate density matrices by summing the normalized density numbers in corresponding cells of each aggregate density matrix and then writing the sum of the normalized density numbers into an appropriate corresponding cell of the multi-level density matrix. Illustratively with reference to the specific matrix cell $A_{1,2}$, computer 12 takes the normalized density number in each cell $A_{1,2}$ of each aggregate density matrix, sums those normalized density numbers, and then writes the sum of those normalized density numbers in cell $A_{1,2}$ of the multi-level density matrix.

Computer 12 constructs a multi-level measure of similarity matrix by vertically combining all the aggregate measure of similarity matrices created at each level. Computer 12 vertically combines the aggregate measure of similarity matrices by summing the similarity numbers in corresponding cells of each aggregate measure of similarity matrix and then writing the sum of the similarity numbers into an appropriate corresponding cell of the multi-level measure of similarity matrix. Illustratively with reference to the specific matrix cell $A_{1,2}$, computer 12 takes the similarity number in each cell $A_{1,2}$ of each aggregate measure of similarity matrix, sums those similarity numbers, and then writes the sum of those similarity numbers in cell $A_{1,2}$ of the multi-level measure of similarity matrix.

Computer 12 develops a multi-level maximum measure of similarity matrix by examining the aggregate maximum measure of similarity matrix at each level to determine which of those matrices has the highest measure of similarity to the target region of the target dichotomy matrix. Computer 12 selects the aggregate maximum measure of similarity matrix with the highest measure of similarity to the target region and stores that matrix as the multi-level maximum measure of similarity matrix.

After developing a multi-level density matrix, a multi-level measure of similarity matrix, and a multi-level maximum measure of similarity matrix, computer 12 displays those matrices on display 13 and/or prints them on printer/plotter 14. Although computer 12 in this preferred embodiment develops a multi-level density matrix, a multi-level measure of similarity matrix, and a multi-level maximum measure of similarity matrix, it should be understood by those of ordinary skill in the art that the multi-level density matrix contains the comprehensive information about the spatial coherences among features within an object. The multi-level density matrix establishes based on the density of the intersections the spatial coherences within the object most likely to host the development of a highly organized zone within the object. Similarly, the multi-level measure of similarity matrix establishes based on aggregate measure of similarity to the target region the spatial coherences within the object most likely to host the development of a highly organized zone within the object. The multi-level maximum measure of similarity matrix indicates the most highly organized zones within the object. As a result of developing and displaying the three matrices, the user will be provided with an indication of-where target related features will be within an object.

Even though the foregoing steps performed by computer 12 in developing a multi-level density matrix, a multi-level measure of similarity matrix, and a multi-level maximum measure of similarity matrix have been described as being performed sequentially, those of ordinary skill in the art will recognize that computer 12 could parallel process those steps. Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A method for establishing spatial coherences among features of an object, comprising the steps of:

measuring at least one physical property of the object at a plurality of different locations to construct at least one data field;

digitizing the data within the data field;

arranging the data within the data field into a matrix;

creating a target dichotomy matrix from the matrix;

transforming the data within the matrix to develop transformation matrices;

developing base dichotomy matrices from the transformation matrices;

creating a full description set of matrices utilizing the base dichotomy matrices;

creating a matrix that establishes spatial coherences among features of the object utilizing the full description set of matrices; and displaying the matrix that establishes spatial coherences among features of the object.

2. The method according to claim 1 further comprising the step of determining a minimum number of base dichotomy matrices necessary to develop the full description set of matrices.

3. The method according to claim 2 wherein the step of creating a matrix that establishes spatial coherences among features of the object utilizing the full description set of matrices, comprises the steps of:

creating density matrices utilizing the full description set of matrices and the target dichotomy matrix;

creating a multi-level density matrix utilizing the density matrices; and displaying the multi-level density matrix to establish spatial coherences among features of the object.

4. The method according to claim 2 wherein the step of creating a matrix that establishes spatial coherences among features of the object utilizing the full description set of matrices comprises the steps of:

creating a plurality of target dichotomy matrices;

creating aggregate density matrices utilizing the full description set of matrices and the plurality of target dichotomy matrices;

creating a multi-level density matrix utilizing the aggregate density matrices; and displaying the multi-level density matrix to establish spatial coherences among features of the object.

5. The method according to claim 1 wherein the step of developing a target dichotomy matrix, comprises the steps of:

placing a boundary around a target region within the matrix;

assigning a logical "1" to any data within the target region; and assigning a logical "0" to any target data outside the target region.

6. The method according to claim 1 wherein the step of transforming the data within the matrix to develop transformation matrices comprises applying at least one transform function to the data within the matrix.

7. The method according to claim 1 wherein the step of developing base dichotomy matrices from the transformation matrices, comprises the steps of:

calculating a median value for a transformation matrix;

assigning a logical "0" to any transformed data within the transformation matrix less than the median value;

assigning a logical "1" to any transformed data within the transformation matrix greater than the median value;

randomly assigning logical "1's" and logical "0's" to any transformed data within the transformation matrix equaling the median value; and repeating the above steps for each transformation matrix.

8. The method according to claim 2 wherein the step of creating a full description set of matrices utilizing the base dichotomy matrices, comprises the steps of:

selecting a desired number of most distinct base dichotomy matrices used in creating the full description set of matrices wherein the desired number is greater than the minimum number;

creating a companion matrix for each of the selected most distinct base dichotomy matrices;

forming a base level of matrices utilizing each of the selected most distinct base dichotomy matrices and its companion matrix; and intersecting the base level matrices in increasing numbers up to the desired number to build intersection level matrices that form the full description set of matrices.

9. The method according to claim 8 wherein the step of selecting a desired number of most distinct base dichotomy matrices used in creating the full description set of matrices wherein the desired number is greater than the minimum number, comprises the step of:

determining a degree of compactness for each base dichotomy matrix;

ordering the base dichotomy matrices from the most compact to the least compact;

assessing the degree of similarity between each pair of base dichotomy matrices;

selecting a threshold degree of similarity number;

utilizing the threshold degree of similarity number to form a number of clusters of base dichotomy matrices equal to the desired number; and selecting the most representative base dichotomy matrix from each cluster.

10. The method according to claim 3 wherein the step of creating density matrices utilizing the full description set of matrices and the target dichotomy matrix, comprises the steps of:

selecting a threshold degree of overlap number;

comparing a matrix of the full description set with the target dichotomy matrix;

selecting the matrix if it satisfies the threshold degree of overlap number;

repeating the above steps for each matrix in an intersection level of the full description set;

developing a density number for each cell of a density matrix utilizing matrices selected from an intersection level of the full description set; and performing the above steps beginning at the minimum number intersection level and proceeding to a preselected intersection level or a base level of the full description set of matrices.

11. The method according to claim 3 wherein the step of creating density matrices utilizing the full description set of matrices and the target dichotomy matrix, comprises the steps of:

selecting a threshold degree of overlap number and a threshold measure of similarity number;

comparing a matrix of the full description set with the target dichotomy matrix;

selecting the matrix if it satisfies the threshold degree of overlap number and the measure of similarity number;

repeating the above steps for each matrix in an intersection level of the full description set;

developing a density number for each cell of a density matrix utilizing matrices selected from an intersection level of the full description set; and performing the above steps beginning at an intersection level corresponding to the minimum number and proceeding to an intersection level that does not satisfy the threshold measure of similarity number, a preselected intersection level, or a base level of the full description set of matrices.

12. The method according to claim 3 wherein the step of creating a multi-level density matrix comprises the step of vertically combining the density matrices.

13. The method according to claim 4 wherein the step of creating aggregate density matrices utilizing the full description set of matrices and the plurality of target dichotomy matrices, comprises the steps of:
- selecting a threshold degree of overlap number;
- comparing a matrix of the full description set with a target dichotomy matrix;
- selecting the matrix if it satisfies the threshold degree of overlap number;
- repeating the above steps for each matrix in an intersection level of the full description set;
- developing a density number for each cell of a density matrix utilizing matrices selected from an intersection level of the full description set;
- repeating the above steps for each target dichotomy matrix of the plurality of target dichotomy matrices;
- summing the density numbers for each cell of each density matrix to form an aggregate density matrix; and
- performing the above steps beginning at the minimum number intersection level and proceeding to a preselected intersection level or a base level of the full description set of matrices.

14. The method according to claim 4 wherein the step of creating aggregate density matrices utilizing the full description set of matrices and the plurality of target dichotomy matrices, comprises the steps of:
- selecting a threshold degree of overlap number and a threshold measure of similarity number;
- comparing a matrix of the full description set with a target dichotomy matrix;
- selecting the matrix if it satisfies the threshold degree of overlap number and the measure of similarity number;
- repeating the above steps for each matrix in an intersection level of the full description set;
- developing a density number for each cell of a density matrix utilizing matrices selected from an intersection level of the full description set;
- repeating the above steps for each target dichotomy matrix of the plurality of target dichotomy matrices;
- summing the density numbers for each cell of each density matrix to form an aggregate density matrix; and
- performing the above steps beginning at an intersection level corresponding to the minimum number and proceeding to an intersection level that does not satisfy the threshold measure of similarity number, a preselected intersection level, or a base level of the full description set of matrices.

15. The method according to claim 4 wherein the step of creating a multi-level density matrix comprises the step of vertically combining the aggregate density matrices.

16. The method according to claim 2 wherein the step of creating a matrix that establishes spatial coherences among features of the object utilizing the full description set of matrices comprises the steps of:
- creating measure of similarity matrices utilizing the full description set of matrices and the target dichotomy matrix;
- creating a multi-level measure of similarity matrix utilizing the measure of similarity matrices; and
- displaying the multi-level measure of similarity matrix to establish spatial coherences among features of the object.

17. The method according to claim 16 wherein the step of creating measure of similarity matrices utilizing the full description set of matrices and the target dichotomy matrix, comprises the steps of:
- selecting a threshold degree of overlap number;
- comparing a matrix of the full description set with the target dichotomy matrix;
- selecting the matrix if it satisfies the threshold degree of overlap number;
- repeating the above steps for each matrix in an intersection level of the full description set;
- developing a similarity number for each cell of a measure of similarity matrix utilizing matrices selected from an intersection level of the full description set; and
- performing the above steps beginning at the minimum number intersection level and proceeding to a preselected intersection level or a base level of the full description set of matrices.

18. The method according to claim 16 wherein the step of creating measure of similarity matrices utilizing the full description set of matrices and the target dichotomy matrix, comprises the steps of:
- selecting a threshold degree of overlap number and a threshold measure of similarity number;
- comparing a matrix of the full description set with the target dichotomy matrix;
- selecting the matrix if it satisfies the threshold degree of overlap number and the measure of similarity number;
- repeating the above steps for each matrix in an intersection level of the full description set;
- developing a similarity number for each cell of a measure of similarity matrix utilizing matrices selected from an intersection level of the full description set; and
- performing the above steps beginning at an intersection level corresponding to the minimum number and proceeding to an intersection level that does not satisfy the threshold measure of similarity number, a preselected intersection level, or a base level of the full description set of matrices.

19. The method according to claim 16 wherein the step of creating a multi-level measure of similarity matrix comprises the step of vertically combining the measure of similarity matrices.

20. The method according to claim 2 wherein the step of creating a matrix that establishes spatial coherences among features of the object utilizing the full description set of matrices comprises the steps of:
- creating a plurality of target dichotomy matrices;
- creating aggregate measure of similarity matrices utilizing the full description set of matrices and the plurality of target dichotomy matrices;
- creating a multi-level measure of similarity matrix utilizing the aggregate measure of similarity matrices; and
- displaying the multi-level measure of similarity matrix to establish spatial coherences among features of the object.

21. The method according to claim 20 wherein the step of creating aggregate measure of similarity matrices utilizing the full description set of matrices and the plurality of target dichotomy matrices, comprises the steps of:
- selecting a threshold degree of overlap number;
- comparing a matrix of the full description set with a target dichotomy matrix;
- selecting the matrix if it satisfies the threshold degree of overlap number;

repeating the above steps for each matrix in an intersection level of the full description set;

developing a similarity number for each cell of a measure of similarity matrix utilizing matrices selected from an intersection level of the full description set;

repeating the above steps for each target dichotomy matrix of the plurality of target dichotomy matrices;

summing the similarity numbers for each cell of each density matrix to form an aggregate measure of similarity matrix; and performing the above steps beginning at the minimum number intersection level and proceeding to a preselected intersection level or a base level of the full description set of matrices.

22. The method according to claim 20 wherein the step of creating aggregate measure of similarity matrices utilizing the full description set of matrices and the plurality of target dichotomy matrices, comprises the steps of:

selecting a threshold degree of overlap number and a threshold measure of similarity number;

comparing a matrix of the full description set with a target dichotomy matrix;

selecting the matrix if it satisfies the threshold degree of overlap number and the measure of similarity number;

repeating the above steps for each matrix in an intersection level of the full description set;

developing a similarity number for each cell of a measure of similarity matrix utilizing matrices selected from an intersection level of the full description set;

repeating the above steps for each target dichotomy matrix of the plurality of target dichotomy matrices;

summing the similarity numbers for each cell of each measure of similarity matrix to form an aggregate measure of similarity matrix; and performing the above steps beginning at an intersection level corresponding to the minimum number and proceeding to an intersection level that does not satisfy the threshold measure of similarity number, a preselected intersection level, or a base level of the full description set of matrices.

23. The method according to claim 20 wherein the step of creating a multi-level measure of similarity matrix comprises the step of vertically combining the aggregate measure of similarity matrices.

24. The method according to claim 2 wherein the step of creating a matrix that establishes spatial coherences among features of the object utilizing the full description set of matrices comprises the steps of:

creating maximum measure of similarity matrices utilizing the full description set of matrices and the target dichotomy matrix;

creating a multi-level maximum measure of similarity matrix utilizing the measure of similarity matrices; and displaying the multi-level maximum measure of similarity matrix to establish the most highly organized zone within the object.

25. The method according to claim 24 wherein the step of creating maximum measure of similarity matrices utilizing the full description set of matrices and the target dichotomy matrix, comprises the steps of:

selecting a threshold degree of overlap number;

comparing a matrix of the full description set with the target dichotomy matrix;

selecting the matrix if it satisfies the threshold degree of overlap number;

repeating the above steps for each matrix in an intersection level of the full description set;

selecting a matrix from the matrices selected from an intersection level of the full description set that has the highest measure of similarity with the target dichotomy matrix; and performing the above steps beginning at the minimum number intersection level and proceeding to a preselected intersection level or a base level of the full description set of matrices.

26. The method according to claim 24 wherein the step of creating maximum measure of similarity matrices utilizing the full description set of matrices and the target dichotomy matrix, comprises the steps of:

selecting a threshold degree of overlap number and a threshold measure of similarity number;

comparing a matrix of the full description set with the target dichotomy matrix;

selecting the matrix if it satisfies the threshold degree of overlap number and the measure of similarity number;

repeating the above steps for each matrix in an intersection level of the full description set;

selecting a matrix from the matrices selected from an intersection level of the full description set that has the highest measure of similarity with the target dichotomy matrix; and performing the above steps beginning at an intersection level corresponding to the minimum number and proceeding to an intersection level that does not satisfy the threshold measure of similarity number, a preselected intersection level, or a base level of the full description set of matrices.

27. The method according to claim 24 wherein the step of creating a multi-level maximum measure of similarity matrix comprises the step of selecting a matrix from the maximum measure of similarity matrices that has the highest measure of similarity with the target dichotomy matrix.

28. The method according to claim 2 wherein the step of creating a matrix that establishes spatial coherences among features of the object utilizing the full description set of matrices comprises the steps of:

creating a plurality of target dichotomy matrices;

creating aggregate maximum measure of similarity matrices utilizing the full description set of matrices and the plurality of target dichotomy matrices;

creating a multi-level maximum measure of similarity matrix utilizing the aggregate maximum measure of similarity matrices; and displaying the multi-level maximum measure of similarity matrix to establish spatial coherences among features of the object.

29. The method according to claim 28 wherein the step of creating aggregate maximum measure of similarity matrices utilizing the full description set of matrices and the plurality of target dichotomy matrices, comprises the steps of:

selecting a threshold degree of overlap number;

comparing a matrix of the full description set with a target dichotomy matrix;

selecting the matrix if it satisfies the threshold degree of overlap number;

repeating the above steps for each matrix in an intersection level of the full description set;

selecting a matrix from the matrices selected from an intersection level of the full description set that has the highest measure of similarity with the target dichotomy matrix;

repeating the above steps for each target dichotomy matrix of the plurality of target dichotomy matrices;

developing a maximum similarity number for each cell of a maximum measure of similarity matrix utilizing for each target dichotomy matrix the matrix selected as having the highest measure of similarity with the target dichotomy matrix; and performing the above steps beginning at the minimum number intersection level and proceeding to a preselected intersection level or a base level of the full description set of matrices.

30. The method according to claim 28 wherein the step of creating aggregate maximum measure of similarity matrices utilizing the full description set of matrices and the plurality of target dichotomy matrices, comprises the steps of:

selecting a threshold degree of overlap number and a threshold measure of similarity number;

comparing a matrix of the full description set with a target dichotomy matrix;

selecting the matrix if it satisfies the threshold degree of overlap number and the measure of similarity number;

repeating the above steps for each matrix in an intersection level of the full description set;

selecting a matrix from the matrices selected from an intersection level of the full description set that has the highest measure of similarity with the target dichotomy matrix;

repeating the above steps for each target dichotomy matrix of the plurality of target dichotomy matrices;

developing a maximum similarity number for each cell of a maximum measure of similarity matrix utilizing for each target dichotomy matrix the matrix selected as having the highest measure of similarity with the target dichotomy matrix; and performing the above steps beginning at an intersection level corresponding to the minimum number and proceeding to an intersection level that does not satisfy the threshold measure of similarity number, a preselected intersection level, or a base level of the full description set of matrices.

31. The method according to claim 28 wherein the step of creating a multi-level maximum measure of similarity matrix comprises the step selecting a matrix from the aggregate maximum measure of similarity matrices that has the highest measure of similarity with the target dichotomy matrix.

* * * * *